(12) United States Patent
Pichura et al.

(10) Patent No.: US 7,658,690 B2
(45) Date of Patent: Feb. 9, 2010

(54) PLATE-LINK CHAIN, PARTICULARLY FOR A MOTOR VEHICLE DRIVE SYSTEM

(75) Inventors: Michael Pichura, Bühl (DE); Martin Vornehm, Bühl (DE); Anton Simonov, Bühl (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 417 days.

(21) Appl. No.: 11/291,515

(22) Filed: Dec. 1, 2005

(65) Prior Publication Data
US 2007/0010363 A1 Jan. 11, 2007

Related U.S. Application Data

(60) Provisional application No. 60/674,824, filed on Apr. 26, 2005, provisional application No. 60/719,955, filed on Sep. 24, 2005, provisional application No. 60/737,831, filed on Nov. 17, 2005.

(30) Foreign Application Priority Data
Dec. 2, 2004 (DE) .................. 10 2004 058 308
Sep. 23, 2005 (DE) .................. 10 2005 045 631

(51) Int. Cl.
F16G 13/04 (2006.01)
F16G 13/00 (2006.01)
F16G 13/02 (2006.01)
F16G 13/06 (2006.01)

(52) U.S. Cl. .................. 474/215; 474/214; 474/216; 474/217; 474/229; 474/206

(58) Field of Classification Search .................. 474/215, 474/216, 217, 212, 213; 74/245, 251; F16G 13/02, F16G 13/04, 13/06, 1/22, 1/24
See application file for complete search history.

(56) References Cited

U.S. PATENT DOCUMENTS

| 4,010,656 A | | 3/1977 | Jeffrey ........................ 474/215 |
| 4,507,106 A | * | 3/1985 | Cole, Jr. ..................... 474/215 |
| 4,708,701 A | * | 11/1987 | Cole, Jr. ..................... 474/245 |
| 5,026,331 A | * | 6/1991 | Sugimoto et al. ........... 474/214 |
| 5,236,399 A | * | 8/1993 | Sugimoto et al. ........... 474/215 |
| 5,372,554 A | * | 12/1994 | Okuda ........................ 474/206 |
| 5,562,559 A | * | 10/1996 | Kolhatkar .................... 474/229 |
| 6,277,046 B1 | * | 8/2001 | Ohara et al. ................. 474/217 |

* cited by examiner

*Primary Examiner*—Robert A Siconolfi
*Assistant Examiner*—San Aung
(74) *Attorney, Agent, or Firm*—Alfred J. Mangels

(57) ABSTRACT

A plate link chain for a motor vehicle drive system. A number of link plates are hingedly connected by pairs of rocker members that extend transversely to the longitudinal direction of the chain. Curved contact surfaces are located on each of the rocker members and link plates, along which contact surfaces the rocker members and link plates contact each other to transmit power. The rocker members also include curved pitch surfaces along which rocker member pairs roll against each other to transmit power. The rocker members are shaped asymmetrically in the height direction and about a cross section plane extending in the longitudinal direction of the chain. Contact surfaces are provided on each of the upper and lower contact surface areas in the height direction of the rocker members.

6 Claims, 5 Drawing Sheets

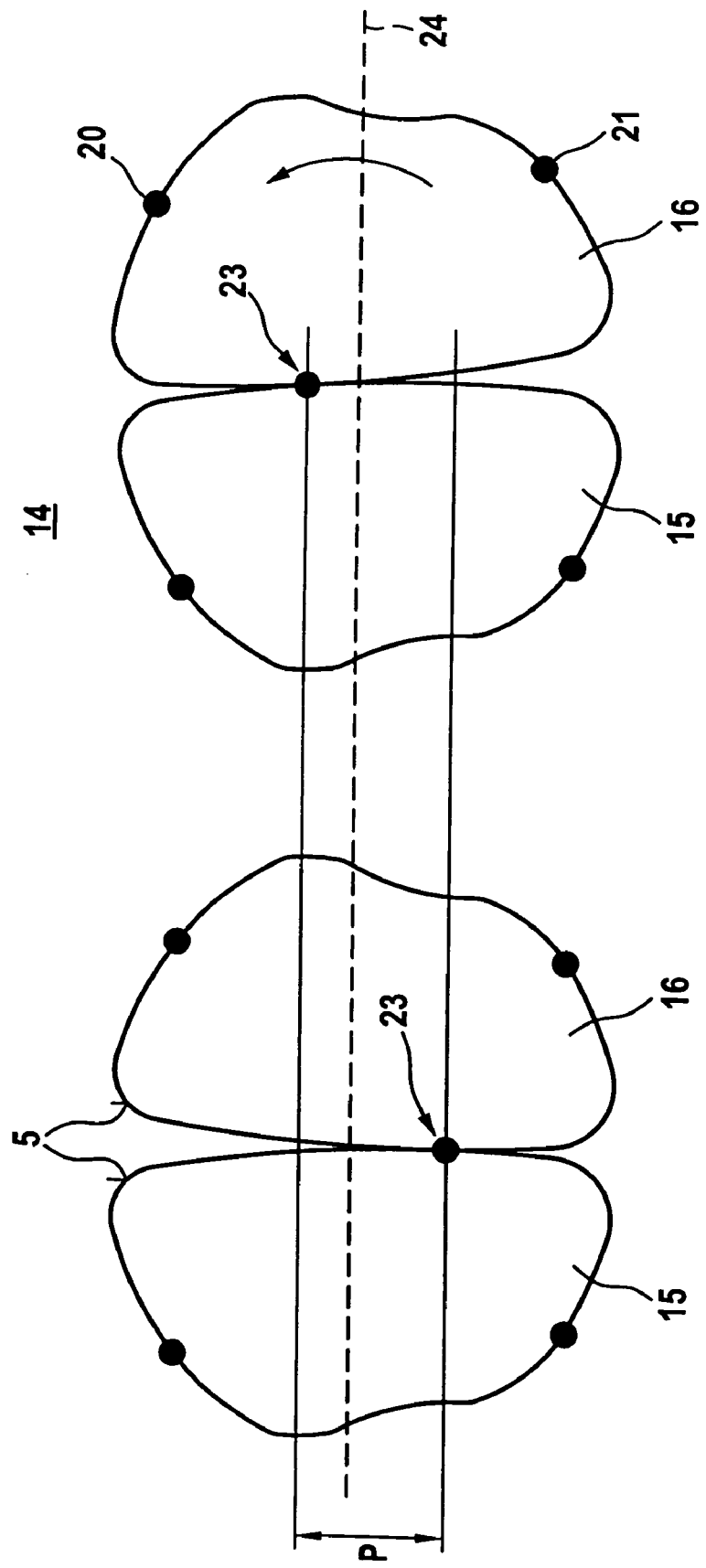

PLATE-LINK CHAIN, PARTICULARLY FOR A MOTOR VEHICLE DRIVE SYSTEM

BACKGROUND OF THE INVENTION

1. Field of the Invention

The present invention relates to a plate link chain, particularly for a motor vehicle drive system, with a large number of link plates hingedly connected to each other by rocker members, where the rocker members extend transversely to the longitudinal direction of the plate link chain. Located on each of the rocker members and link plates there are curved contact surfaces, along which the rocker members and link plates are in contact with each other to transmit power. Also located on the rocker members are curved pitch surfaces along which the rocker members roll against each other to transmit power.

2. Description of the Related Art

Such a plate link chain can be a toothed chain, which can be employed, for example, to transfer power in an all-wheel power divider transmission of a motor vehicle, or also, for example, on an auxiliary unit of the internal combustion engine of the motor vehicle. In the named cases the plate link chain is designed as a toothed chain and transmits tractive force between a driven and a driving sprocket wheel. Such a plate link chain can also be used, for example, as a traction medium in a belt-driven conical-pulley transmission of a motor vehicle, where, in this case, the tractive force is not transmitted by a positive connection through a toothed engagement of the plate link chain with the sprocket wheel, but by frictional force between two conical pulley pairs of the belt-driven conical-pulley transmission.

Such a plate link chain installed in a belt-driven conical-pulley transmission is also referred to as a rocker joint chain, where the rocker members or pressure pieces are arranged in pairs in plate openings of the link plates, and have pitch surfaces that roll against each other. In doing so they absorb the tractive force transmitted by the plate link chain in the form of compressive stresses, and introduce corresponding forces into the link plates as the reactive force thereto, where the transfer of force between the rocker members and the link plates takes place at curved contact surfaces that are formed on the rocker members and the link plates.

Thus, such a plate link chain has an articulating function, which is taken over by the rocker members with their respective pitch surfaces, and a contact function between the rocker members and the link plates, and for this purpose they must be designed in accordance with the required strength. If a deflection of the plate link chain from its stretched position occurs, when the chain changes from its stretched position to a deflected position—for example when the plate link chain runs over sprocket wheels or is clamped between two conical pulleys and bends—there must be high security against rotation between the rocker members and the link plates, since otherwise relative motion between the link plates and the rocker members results in friction-induced wear and hence in a possible early failure of the plate link chain.

The transmission of force between the rocker members and the link plates usually takes place in the area of a contact surface between the link plates and the rocker members, which, regarded along the longitudinal direction of the plate link chain, is located opposite the pitch surfaces of the rocker members, i.e., in the area of the back surfaces of the rocker members. At this contact surface between the rocker member and the link plate, the rocker member introduces a compressive force into the link plate which, due to the spacing present between the place where the force is introduced into the link plate and the upper or lower edge area of the rocker member receiving opening of the link plate, viewed in the direction of the rocker member height, results in a moment which promotes the formation of cracks in the link plate, and as time goes on can lead to growth of the cracks and thus to failure of the link plate.

A link plate is known in which there is not only one contact surface present between the rocker member and the link plate—namely the rear contact surface, relative to the pitch surfaces between the rocker members, viewed in the running direction of the plate link chain, which is formed on the rear surface of the rocker member. But two contact surfaces are formed between the rocker member and the link plate, one of which is located above and one below a plane that bisects the rocker member across the height direction, viewed transversely to the longitudinal direction of the plate link chain. This design has the advantage of division of force over the design with only one contact surface.

Based on U.S. Pat. No. 4,507,106, a plate link chain for the transmission of force is known in which the rocker members have pitch surfaces opposite each other and there are two contact surfaces formed on the rocker members at which the rocker members are in contact with contact surfaces of the link plates, and which serve to transmit power. The rocker members of this plate link chain, regarded in a cross sectional view running transversely to the longitudinal direction of the plate link chain, have a nearly circular shape in the area of the contact surfaces, and hence have the disadvantage of inadequate protection against rotation, so that relative motion can occur between the rocker members and the link plate when the chain is deflected, which leads to significant wear in the contact surface area between the rocker members and the link plates, and hence to early failure.

An attempt was made to solve this problem of safeguarding the rocker members against rotation of the link plates with the plate link chain known from U.S. Pat. No. 4,010,656 by having the contact surface area of the rocker members and the matching contact surface area of the link plates are not almost circular in shape—since such a design promotes relative rotation of the rocker members in the link plates—but by having the rocker members nearly triangular in shape in a corresponding cross sectional view, so that largely straight-lined contact surfaces on the rocker members are in contact with largely straight-lined contact surfaces of the link plates, so that safeguarding against rotation was realized. If this known plate link chain transitions from an extended position to a curved position, such a design may work against rotation of the rocker members in the link plates, but the rocker members are supported on their edges on the link plates. Such edge supporting results in significant tension peaks in the area of the contact surfaces between the rocker members and the link plates, so that such a design again also promotes the growth of cracks on the link plates, and the life of the known plate link chain is thereby reduced.

Starting from this point, an object of the present invention is to provide a plate link chain, in particular for a motor vehicle drive system, with which lower loads on the link plates are realizable, while the cross sectional area of the rocker members remains largely the same in comparison to known plate link chains, and provision is also made for the requirements for anti-rotation protection of the rocker members in the link plates.

SUMMARY OF THE INVENTION

The invention provides for a plate link chain, in particular for a motor vehicle drive system, with a large number of link plates hingedly connected with each other by rocker members. The rocker members run transversely to the longitudinal direction of the plate link chain. There are curved contact surfaces located on each of the rocker members and link plates, along which contact surfaces the rocker members and link plates are in contact with each other to transmit power, and there are curved pitch surfaces on the rocker members, along which the rocker members roll against each other to transmit power. The rocker members are shaped asymmetrically in the height direction of the rocker members in a cross section running in the longitudinal direction of the plate link chain, and the contact surfaces are provided on the upper and lower contact surface areas in the height direction of the rocker member, between a rocker member and a link plate.

If known rocker members from plate link chains are examined, these are symmetrically constructed in a rocker member height direction regarded transversely to the longitudinal direction of the plate link chain. If a plane that bisects the rocker member height is sketched in an individual rocker member, known rocker members are constructed in such a way that this plane serves as a mirror plane for the rocker member, which is thus virtually cut, so that the upper half of the rocker member is mirror-symmetrical to the lower half of the rocker member. This design is advantageous when fabricating the plate link chain, since the rocker members do not have to be separated selectively according to position, but can simply be installed without having to be selected based on their position relative to the opening in the plate link chain.

If a plane that bisects the height of the rocker member is sketched in a rocker member according to the present invention, the rocker member according to the invention is asymmetrically constructed, i.e., in the area above this virtual rocker member height bisecting plane the rocker member is not symmetrical with the area of the rocker member below that plane. Hence, the rocker member is asymmetrically constructed in the direction of the rocker member height, and it has greater rigidity than known rocker members with comparable cross sectional area, although in a cross section running in the longitudinal direction of the plate link chain it is less wide in the lower area, i.e., of thinner design, than known rocker members. Since the rocker member according to the invention is of thicker design than known rocker members in a direction transverse to the rocker member height direction, i.e. it has a greater width than known rocker members, it has greater rigidity overall than symmetrically designed, known rocker members.

This asymmetrical design of the rocker members, and thus also of the link plate openings which receive the rocker members, in combination with the divided contact surfaces, i.e., not only one contact surface opposite the rocker member pitch surface between the rocker member and the link plate, but an upper and a lower contact surface on the rocker members and the link plates, regarded in the longitudinal direction of the plate link chain, i.e., an upper contact surface and a lower contact surface, results in a contact surface being usable which is larger overall.

This also leads to a division of the contact force, and thus also to the forces acting between the upper and lower contact surfaces of the rocker members and link plates being introduced at places that are less harmful for the link plates, namely at places with a smaller spacing, regarded in the direction of the rocker member height, to the edge of the link plate opening that receives the rocker member, for which reason lower stresses result at the edge of the link plate opening, and hence the occurrence or growth of cracks is avoided.

In the plate link chain according to the invention there is a division of force, and since the points for introduction of force into the link plate are closer to the edge of the opening that receives the rocker members, because of the reduced force and also the shorter lever arm, there are lower moments at the edge of the link plate opening, and hence lower stresses at the edge of the opening, for which reason the crack resistance, and thus the life of the link plate, increases.

According to a refinement of the invention, it is also provided that a pitch radius of the pitch surfaces be selected such that a pitch point between rocker members moves from a position located below the plane that bisects the rocker member height, when the plate link chain is stretched out, to a position above the plane when the plate link chain is substantially curved. If the plate link chain according to the invention is under a tension load, the pitch point between the rocker members is below a plane that bisects the rocker member height. If the plate link chain is circulating, for example over a sprocket wheel or between two conical disk pairs of a belt-driven conical-pulley transmission, so that it is curved, this pitch point moves to a position above that plane.

If the pitch point migrates in such a way with a known plate link chain, this leads to rotation of the rocker members in the link plates, and hence has a wear-increasing effect. In contrast, with the plate link chain according to the invention this does not lead to an increase in wear, since the forces that prevail at the upper and lower contact surfaces between the rocker members and link plates operate against rotation due to the two-point contact, and thus a migration of the pitch point is possible and is permissible in the plate link chain according to the invention.

Since the pitch point migrates when the pitch radius of the pitch surfaces is increased, that results in larger contact surfaces of the rocker members in the area of the pitch surfaces, and thus to a corresponding reduction of tension. In the plate link chain according to the invention the pitch radius can be increased without resulting in rotation of the rocker members relative to the link plates, as occurs with known link plates. In contrast to known plate link chains, the pitch radius of the pitch surface can therefore be increased without there being a risk of rotation of the rocker members in the link plate openings as a result.

Furthermore, a refinement of the invention provides that the contact surfaces in the respective end areas have a curved runout, such that edge support between rocker member and link plate is largely avoided. In contrast to known link plates, the contact surfaces thus do not have a configuration in the end area that would result in edge support, and thus locally high tension peaks, but curved runouts that avoid edge support.

Known plate link chains, with only one contact surface that is opposite to the pitch surface of the rocker members and is between the rocker members and the link plates, have a relief section both above and below the contact surface, into which the production-related tolerances are placed when manufacturing the link plates. Furthermore, these relief sections are formed with large curvatures, i.e., small curvature radii, and it has turned out that increased growth of cracks also occurs at these places, since the relief section is closed, as it were, when tensile force is applied to the plate link chain, due to the deformation of the link plates. Hence, an area of the link plate with large curvature is subjected to large tensile forces, which must be severely redirected because of the large curvature, and thus result in stress peaks and promote the growth of cracks.

The plate link chain according to the invention takes a different direction here. The invention provides for the formation of a relief section between the two contact surfaces, which can be provided, for example, on the rocker members, so that the relief section lies in an area outside of the contact surfaces and thus in a contact surface region between the rocker members and the link plates which lies outside of the force field.

A refinement of the invention provides for the link plates to be designed so that a plate opening for receiving rocker members has areas with the greatest curvature in the contact surface area intended for contact with rocker members. As already explained earlier, the plate link chain according to the invention is distinguished by only one relief section between the two contact surfaces, and not two relief sections, as in the case of known plate link chains. It has been found that plate openings areas with the greatest curvature can be placed in the contact surface area intended for contact with the rocker members, without this leading to the formation of cracks.

A starting point when providing the plate link chain according to the invention is also to avoid an increase in the cross sectional area of the rocker members. Since areas with large curvature, and hence small curvature radii, thus also occur on the link plates, in the case of the plate link chain according to the invention these areas with large curvature are placed in the contact surface areas of the link plate, since in these areas compressive force is transmitted between the rocker members and the link plates, so that in these areas the link plates are not only under tension but also under compression, and thus this area with large curvature, and hence small curvature radii, does not represent a sensitive zone. The link plates of the plate link chain according to the present invention thus have their greatest curvature in the area of the contact surfaces, and not outside of the contact surface, as is the case with known plate link chains.

During operation, plate link chains are also subjected to dynamic loads, such as jumps in tensile force due to impact loads or the like. These impact loads result in an undefined motion of the rocker member in the link plate opening, especially in a direction of rocker member height, that is, in a direction transverse to the longitudinal direction of the plate link chain.

To counter such an uncontrolled motion of the rocker member in the link plate opening, the invention provides for the link plates to have a plate opening with radii that form the plate opening by segments, which are not concentric, with radii that form the cross sectional shape of the rocker members received in the plate opening. The reception of the rocker members in the plate opening of the link plates is thus not indifferent, but stable. In the case of such a load, for example a shock-like load, the rocker members thus cannot migrate in an upward or downward direction, so that the wear mechanism identified earlier is interrupted.

In the case of the plate link chain described at the beginning, the center of curvature of the contact surface opposite the pitch surface of the rocker members is concentric at the same level with the center of curvature of the corresponding back surface of the rocker member. It has been recognized that this sort of concentric design has the effect of promoting wear.

In contrast to this, the invention provides that in a cross section running in the longitudinal direction of the plate link chain, the center of a tangential segment is on a back surface lying opposite the pitch surface of the rocker members, below the plane that bisects the rocker member height. The result of this is that the back surface of the rocker member is positioned obliquely relative to the pitch surface of the rocker member, whose center point is at about the level of the center of the rocker member, i.e., at about the level of the plane bisecting the rocker member height.

BRIEF DESCRIPTION OF THE DRAWINGS

The present invention will now be explained in greater detail below on the basis of the drawings. The figures show the following:

FIG. 8: a schematic diagram to illustrate the migration of the pitch point on a pair of rocker members of a plate link chain according to the invention.

DESCRIPTION OF THE PREFERRED EMBODIMENTS

Figure 1:
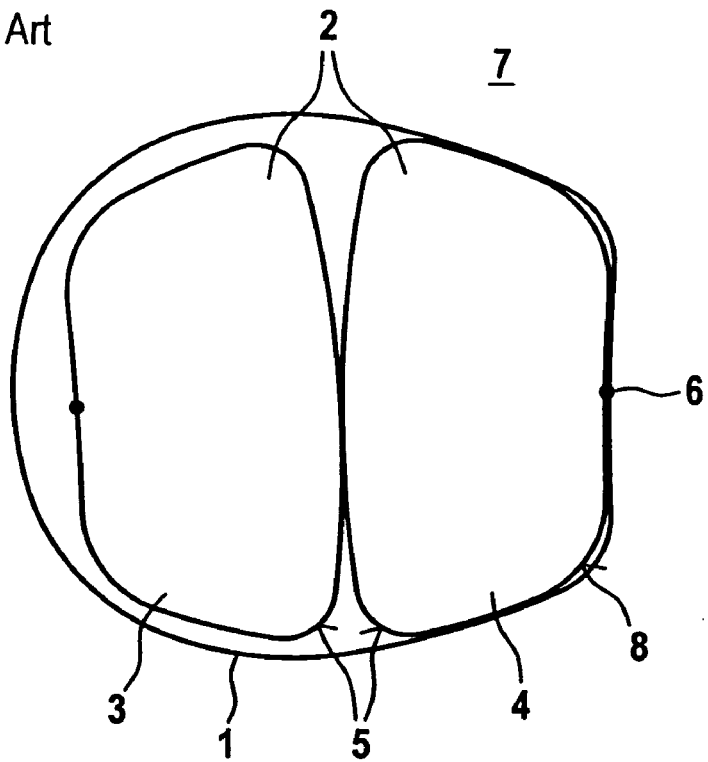
FIG. 1: a side view of two rocker members of a known plate link chain positioned in a link plate opening.

FIG. 1 shows a schematic representation of a detail of a known plate link chain having two rocker members 2 positioned in an opening 1 of a plate link.

As can be clearly seen, the rocker member 3 in the drawing plane on the left side can roll off in opening 1 of the link plate, while rocker member 4 is in contact in opening 1.

Positioned between the two rocker members 3, 4 are pitch surfaces 5, at which the rocker members can roll against each other when the plate link chain transitions from an extended position to a curved position, which is the case for example when the running direction is reversed at a pulley. At the pitch surfaces 5 compression forces are transmitted between the rocker members 3, 4, which are transmitted in the illustrated case from rocker member 4 through contact surface 6 into link plate 7. As can be clearly seen, in the case of the known plate link chain only one contact surface 6 is formed on the back 8 of rocker member 4 opposite the pitch surfaces.

Figure 2:
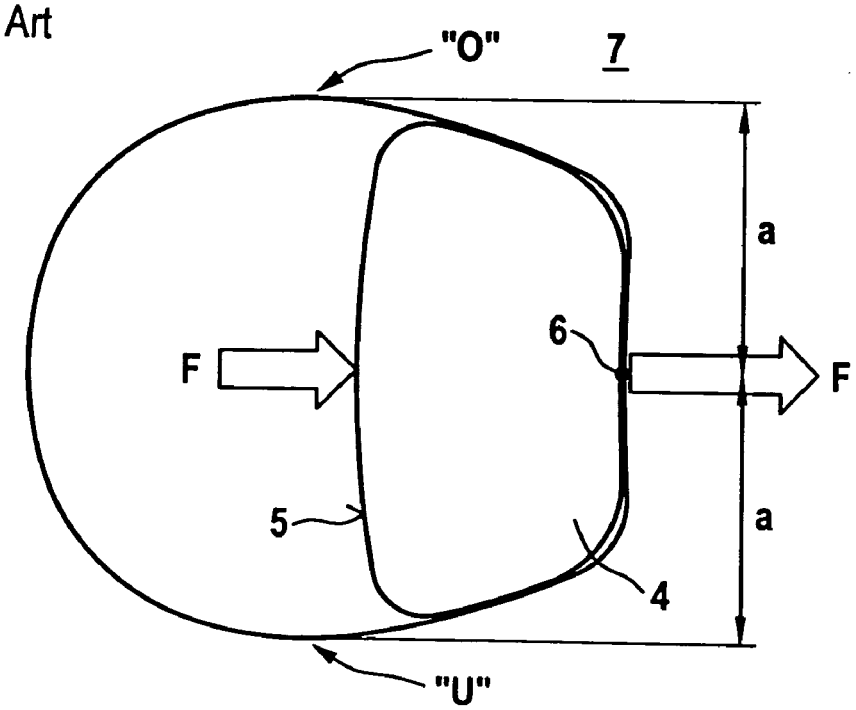
FIG. 2: a view similar to FIG. 1 in which one rocker member has been omitted; the figure serves to explain the connection between force present at a contact surface and the lever arm at the edge of the link plate opening.

FIG. 2 shows an illustration similar to FIG. 1, in which the rocker member 3 in the drawing plane on the left side of FIG. 1 has been omitted. The compressive force F introduced into rocker member 4 via the pitch surface 5 is introduced into link plate 7 at the contact surface 6, and there leads via lever arm "a" to a bending moment, which bears on both the area designated with "O" and that designated with "U." Resulting bending stresses are overlaid with a tensile stress due to the tensile load on the link plate 7, so that the result is a stress pattern in link plate 7 as represented in FIG. 3 of the drawing with different types of shading.

As can be clearly seen, material stresses of over 1000 $N/mm^2$ arise in the area designated in FIG. 2 with "O," while in the area designated with "U" material stresses of over 1500 $N/mm^2$ arise, namely in the area of a lower relief section 9. The reason for this is that in the area of the lower relief section 9 a superimposition of bending stresses, tensile stresses, and compression stresses arises, since link plate 7, which is under tension, is elastically deformed. Contact of link plate 7 and rocker member 4 also occurs in the area of lower relief section 9 as well as upper relief section 10, and these compression stresses increase in the area of lower relief section 9 due to the deflection of the plate link chain.

Figure 3:
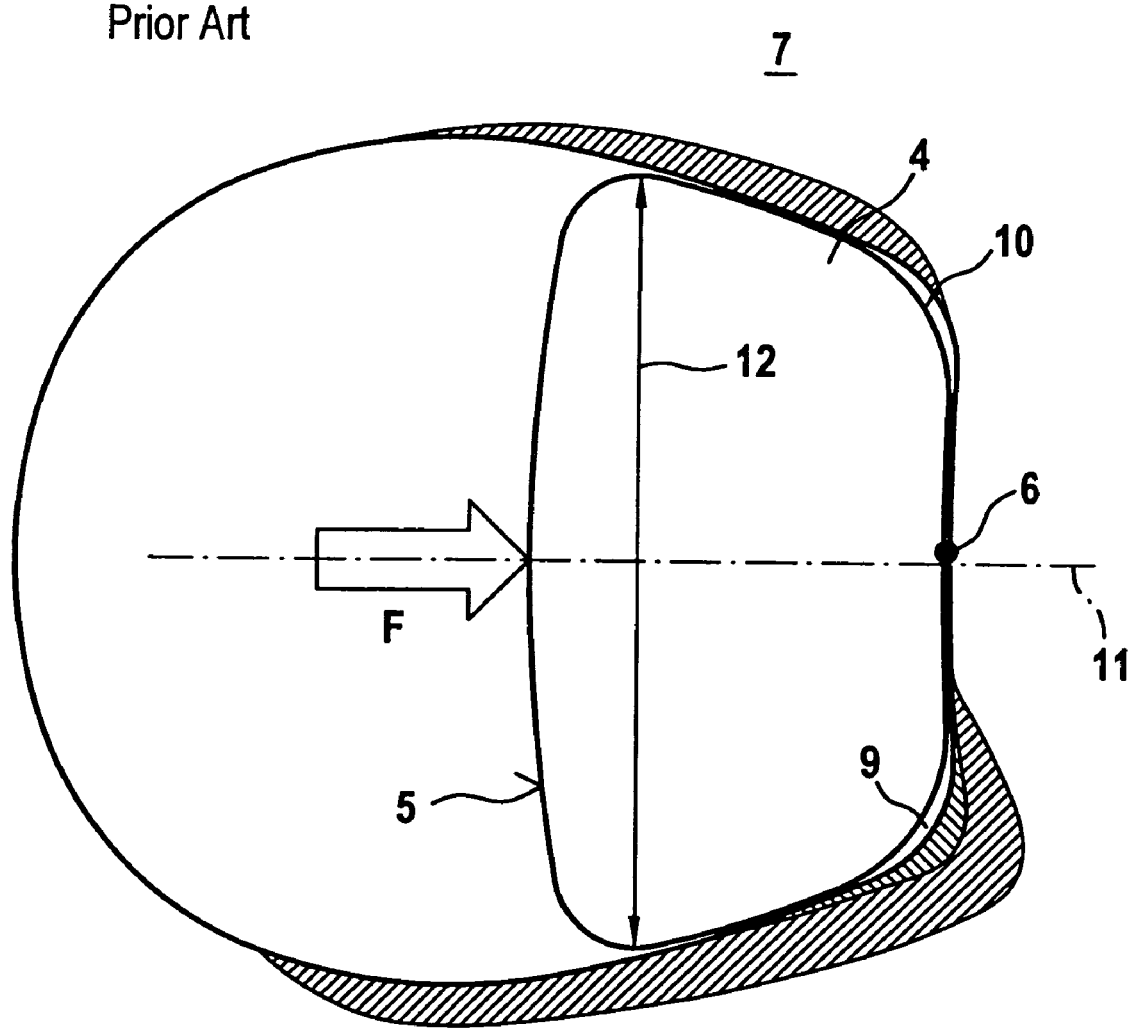
FIG. 3: a depiction of the stress pattern in a link plate of a known plate link chain.

As can be seen on the basis of FIGS. 1 to 3 of the drawings, the known rocker member 4 is symmetrically shaped in the direction of rocker member height 12, so that a line that is visible in the two dimensional depiction as straight line segment 11 represents a plane of symmetry, in reference to which rocker member 4 is symmetrical in the direction of rocker member height 12.

Figure 4:
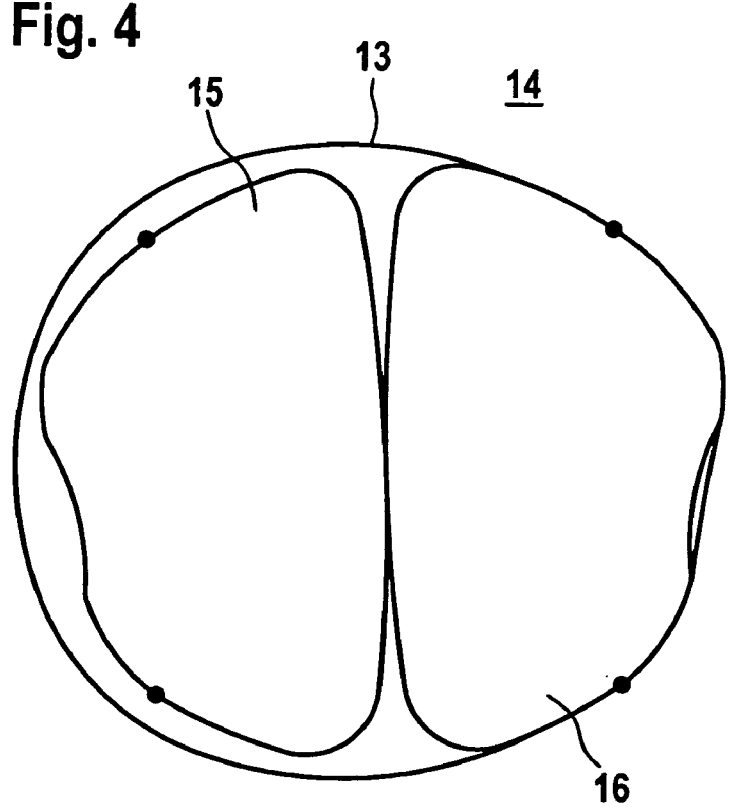
FIG. 4: a side view of a section of an embodiment of the present invention, in which two rocker members positioned in a link plate opening are shown.

FIG. 4, in a view similar to FIG. 1, shows a detail of a plate link chain according to the invention, with two rocker members 15, 16 positioned in an opening 13 of a link plate 14.

Figure 5:
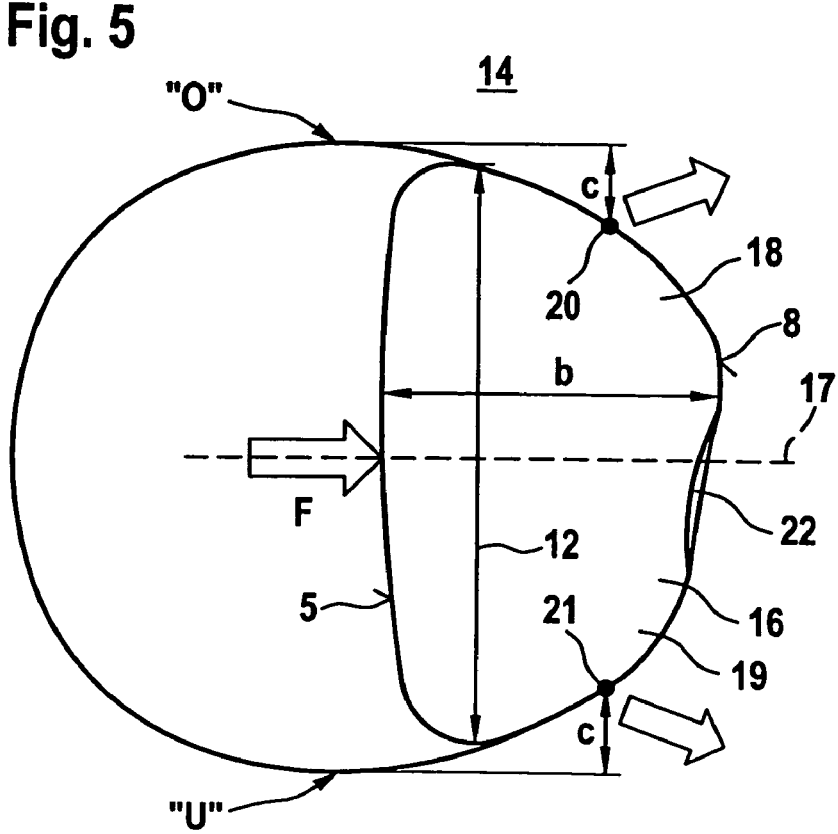
FIG. 5: an illustration similar to FIG. 4, in which the rocker member in the drawing plane on the left side has been omitted, where the purpose of the illustration is to explain the relationship of force and lever arm in the area of the contact surfaces of the plate link chain according to the invention.

In contrast to the known rocker member 4, rocker members 15, 16 are not shaped symmetrically in the direction of rocker member height 12, (see FIG. 5 of the drawing), but asymmetrically. In FIG. 5, with reference numeral 17 a straight line is drawn that corresponds to the straight line 11 in FIG. 3, but in contrast to the straight line 11 according to FIG. 3 it does not represent a plane of symmetry.

Rocker member 16 is asymmetrically shaped in the direction of rocker member height 12, and cannot be shown at a plane of symmetry on the basis of mirroring. In area 18 above straight line 17, rocker member 16 has greater width in the direction of the width "b" than in the lower area 19. Rocker member 16 has significantly greater strength than rocker member 4—although both rocker members have the same cross sectional area.

A force applied to rocker member 16 in the direction of arrow "F" bears on the upper contact surface 20 on the contact surface of link plate 14 formed there, and below on the lower contact surface 21, so that the force "F" is divided and is applied to contact surfaces 20, 21. Because of the significantly smaller lever arm "c" (FIG. 5) compared to the lever arm "a" (FIG. 2), the forces applied to contact surfaces 20, 21 have significantly smaller moments in the upper area "O" and the lower area "U" respectively.

Figure 6:
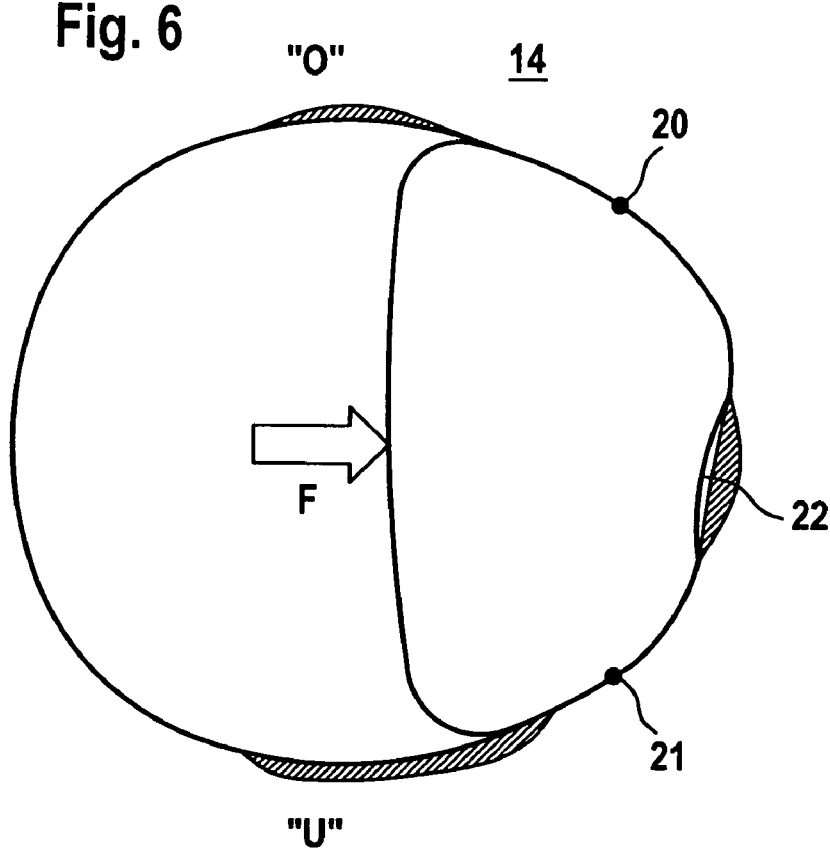
FIG. 6: a schematic diagram to illustrate the stresses in the link plate of a plate link chain according to the invention.

FIG. 6 of the drawing shows a representation of the stresses in link plate 14 of the plate link chain according to the present invention. As can be clearly seen, material stresses that were still evident on the basis of FIG. 3 with values of over 1500 N/mm$^2$ have completely disappeared.

As can be seen from FIG. 5, rocker member 16 has a relief section 22 in the area of the back surface 8 opposite pitch surface 5, which is formed between the upper and the lower contact surfaces 20, 21. Since this relief section 22 is located outside of the contact surfaces 20, 21, it is also outside of the main force field area of link plate 14, and in this way also does not increase the stresses operating in link plate. Instead, in the area of relief section 22, only stresses occur with values that do not exceed the stress values in the upper area "O" and the lower area "U."

Figure 7:
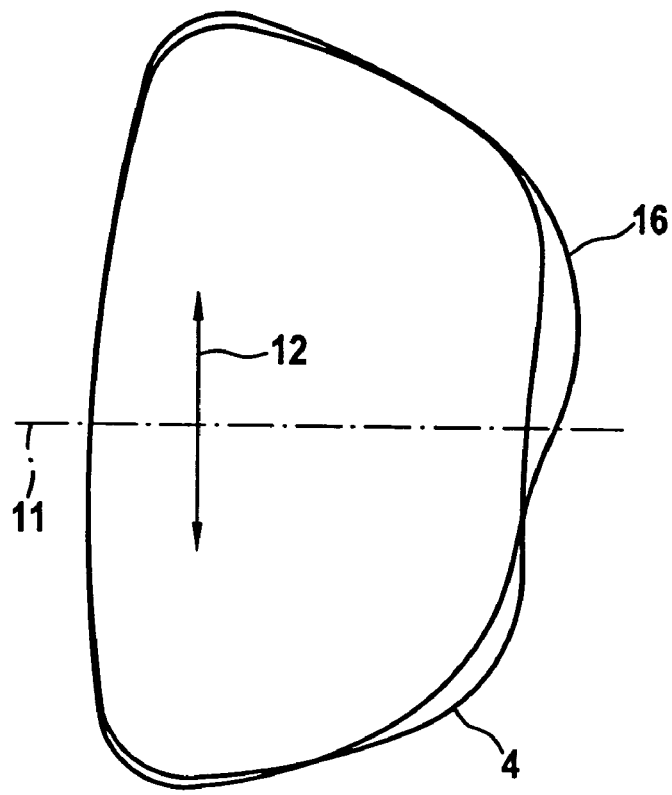
FIG. 7: a schematic diagram to illustrate the differences between a known rocker member and a rocker member of the plate link chain according to the present invention.

FIG. 7 shows a direct comparison of the cross sectional shape assumed along a longitudinal direction of the plate link chain by the known rocker member 4 and the rocker member 16 according to the invention. As can clearly be seen, the known rocker member 4 is symmetrically shaped in the direction of rocker member height 12, and can be shown on the basis of mirroring at the plane of symmetry 11, while rocker member 16 according to the invention is shaped asymmetrically in the direction of rocker member height 12.

FIG. 8 shows, in the illustration on the left side, two rocker members 15, 16 with a pitch point 23 formed on the pitch surface 5. Pitch point 23 is below a plane 24 bisecting the rocker member height when the plate link chain is in the extended position (which corresponds to the illustration on the left side in FIG. 8). When the plate link chain is curved—this corresponds to the illustration on the right in the drawing plane in FIG. 8—pitch point 23 migrates in the direction above the plane 24. This migration of the pitch point is a consequence in particular of the enlargement of the pitch radius of the pitch surfaces 5 of rocker members 15, 16, so that the compressive stresses operating between rocker members 15, 16 also become smaller due to this expansion of area. The migration of the pitch point 23 (represented by arrow "P" in FIG. 8) does not result in unacceptable rotation of rocker member 16 relative to link plate 14, since the forces operating between link plate 14 and rocker member 16 in the area of the upper contact surface 20 and the lower contact surface 21 act against this rotation of rocker member 16 relative to link plate 14.

The link plate according to the invention is distinguished by high anti-rotation protection of the rocker members relative to the link plates and by a reduction of the stress load on the link plates. Thereby providing an improvement in the wear performance and hence longer service life.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate link chain for a motor vehicle drive system, said chain comprising: a plurality of link plates hingedly connected with each other by rocker members that extend transversely to a longitudinal direction of the plate link chain, curved contact surfaces located on each of the rocker members and link plates along which the rocker members and link plates are in contact with each other to transmit power, curved pitch surfaces on the rocker members that are opposite from the rocker member curved contact surfaces that contact the curved contact surfaces of the link plates and along which the rocker members roll against each other to transmit power and having a pitch surface radius of curvature such that a pitch surface contact point between contacting rocker members moves from a first position located below a plane that bisects the rocker member height when the plate link chain is straight, to a second position above the bisecting plane when the plate link chain moves from a straight condition to a curved condition, wherein the rocker members are shaped asymmetrically in a height direction of the rocker members and about a cross section plane extending in the longitudinal direction of the plate link chain, wherein the contact surfaces of the rocker members and link plates are located on an upper and a lower contact surface area in the height direction of the rocker members and wherein in the longitudinal direction of the plate link chain the rocker members are wider at the upper contact surface area than they are at the lower contact surface area, and wherein a concave region is provided between the upper and lower contact surfaces of the rocker members.

2. A plate link chain according to claim 1, wherein the rocker member contact surfaces are provided in respective end areas with a curved runout, so that edge support between rocker members and link plates is substantially avoided.

3. A plate link chain according to claim 1, wherein the link plates include a plate opening for receiving rocker members and have curved areas with a largest curvature in the contact surface area in contact with rocker members.

4. A plate link chain according to claim 1, wherein the link plates include a plate opening having radii that define the plate opening by segments that are not concentric with radii that define the cross sectional shape of the rocker members received in the plate opening.

5. A plate link chain according to claim 1, wherein in a rocker member cross section in the longitudinal direction of the plate link chain the middle of a tangential segment is on a back surface opposite the pitch surface of the rocker members below a plane that bisects the rocker member in the height direction.

6. A plate link chain according to claim 1, wherein between the upper and lower contact surface areas of the link plate the link plate surface is spaced from the rocker member concave region to provide a relief section therebetween.

* * * * *